Jan. 29, 1963 W. P. HAASS 3,075,909
REACTIONAL VESSEL
Filed April 12, 1957 2 Sheets-Sheet 2

WITNESSES
Edwin E. Bassler
Donald J. Smith

INVENTOR
Walter P. Haass
BY
Arthur T. Stratton
ATTORNEY

United States Patent Office 3,075,909
Patented Jan. 29, 1963

3,075,909
REACTIONAL VESSEL
Walter P. Haass, Wilkinsburg, Pa., assignor to Westinghouse Electric Corporation, East Pittsburgh, Pa., a corporation of Pennsylvania
Filed Apr. 12, 1957, Ser. No. 652,627
8 Claims. (Cl. 204—193.2)

The present invention relates to reactional vessels, and more particularly, to a means for shielding the walls thereof from heat or other radiation evolved from a reaction being carried on within the vessel.

In certain types of reactions, it is necessary to maintain a coolant flow through the vessel utilized therefor in order to maintain the reaction within acceptable temperature limits or otherwise to control the reaction. In many cases, the heat or other forms of radiation initiated by the reaction causes undue thermal stresses to be developed within the walls of the vessel. Although the walls of the vessel partially are cooled by the coolant flow maintained interiorly of the reactional vessel, in many cases the flow of coolant adjacent the walls of the vessel is essentially stagnant and the removal of heat transferred to or induced in the walls of the reactional vessel is insufficient to present excessive heating and the development of undue thermal stresses therein.

In those reactional vessels employed or contemplated for use in conjunction with a nuclear power plant, the development of heat within the walls of the reaction vessel is accentuated by the absorption within the walls of the vessel of neutrons and gamma rays which are emitted in a well-known manner as a result of the fissioning process being sustained within the reactional vessel. The absorption of the aforesaid nuclear radiation generates additional heat within the walls of the vessel which thereby further accentuates the thermal stresses induced therein. The additional heat developed in this manner in a nuclear reactional vessel renders the main coolant maintained interiorly of the reactor vessel still less adequate for the removal of sufficient heat in order to reduce the thermal stresses in the walls of the vessel to an acceptable level.

It has been proposed hitherto that one or more interior shells, known as thermal shields, be disposed adjacent the interior surface of the reactional vessel but spacedly removed therefrom. These thermal shields are provided with the same general configuration as that of the reactional vessel walls but are provided with openings arranged at the top and bottom thereof so that both the inlets and the outlets of the flow passages confined between the reactional vessel wall and the thermal shields communicate with the interior of the reactional vessel to afford passage provided for portions of the main coolant fluid. The thermal shields thus are arranged to collect heat or other radiation emitted by the reaction maintained within the vessel and thereby to prevent absorption thereof by the walls of the reactional vessel. Consequently, the heat generated within the thermal shields must be removed by suitable means.

In prior thermal-shielding systems, the thermal shields were cooled merely by the peripheral flow of the main reactional vessel coolant; that is to say, by those portions of the coolant flow adjacent the walls of the reactional vessel. However, as pointed out heretofore, such peripheral flow of the vessel coolant is reduced substantially by the fluid friction thereof adjacent the walls of the vessel, and therefore, is comparatively stagnant, at least in certain portions of the previously described flow passages. This arrangement is particularly disadvantageous when the vessel coolant is a slurry or suspension, as in the case of a quasi-homogeneous or slurry-type reactor, for suspended particles, of course, tend to settle out in the comparatively stagnant areas. As a result, extensive trial-and-error experimentation was required to adjust the spacing between the thermal shields and the walls of the vessel in order to obtain an adequate coolant flow for the thermal shields. Moreover, upon once arranging the thermal shields in this manner, no means were then available for varying the coolant flow between and around the thermal shields in order to meet differing operating conditions within the reactional vessel. Additionally, the comparatively large space required between each of the thermal shields and the wall of the reactional vessel to permit adequate peripheral flow, as aforesaid, of the main coolant stream between and around the thermal shields utilized space vitally needed within the reactional vessel and, consequently, necessitated the employment of a comparatively larger vessel.

In view of the foregoing discussion, it is an object of the present invention to provide a more efficient reactional vessel.

Another object of the invention is to provide novel and efficient means for cooling and shielding the interior walls of the reactional vessel.

A further object of the invention is to provide means for adequately cooling the thermal shields of a reactional vessel.

Still another object of the invention is to provide efficient means for increasing and for controlling the coolant flow maintained between the thermal shields and the interior wall of the vessel.

Another object of the invention is to provide means for cooling the thermal shields of reactional vessels, with the cooling means being conveniently associated with the main vessel coolant system and requiring a minimum of plumbing connections.

These and other objects, features and advantages of the invention will be apparent from a study of the following description relevant to exemplary embodiments of the invention, with the description being taken in conjunction with the accompanying drawings, wherein.

Figure 1:
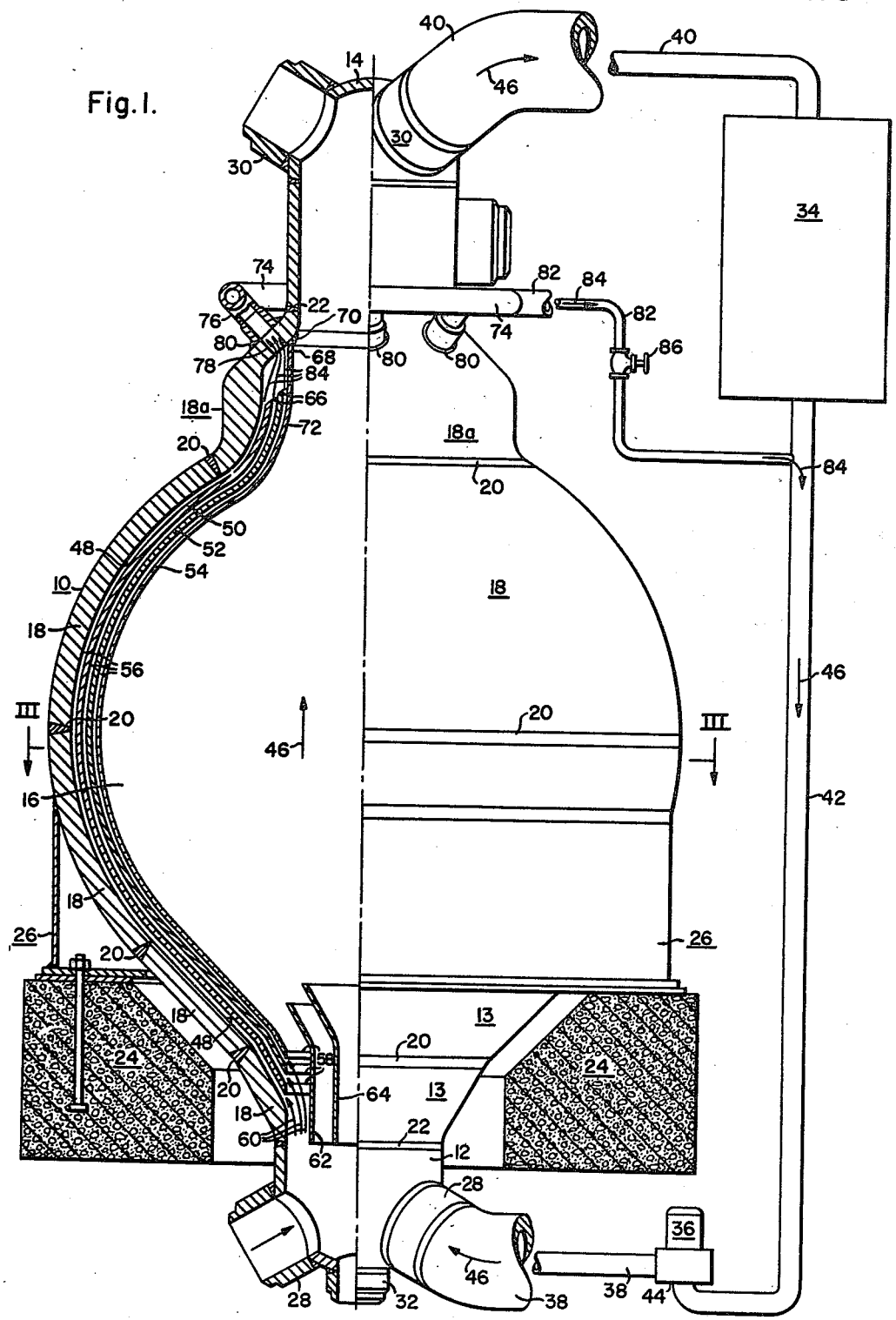
FIGURE 1 is an elevational view, partly sectioned and partly diagrammatic, of one form of a reactional vessel constructed in accordance with the invention.

In accordance with the invention, means are associated with a reactional vessel coolant system for applying a controllable pressure drop across the thermal shields of the vessel. A coolant flow thereby is maintained between and around the thermal shields of the reactor vessel which is partially segregated from the main coolant flow of the reactor vessel, but which is closely associated therewith. Accordingly, the requirement of an additional pump for the thermal shield coolant system not only is obviated, but also, in the case of nuclear reactors, the requirement of biological shielding therefor is minimized. The coolant system for the thermal shields for the vessel is coupled to the main coolant system of the vessel in a manner such that a slightly larger pressure drop across the thermal shields of the vessel is attained without employment of additional pumping facilities and with only a minimum of plumbing connections. The aforesaid arrangement not only facilitates adjusting the coolant flow between the spaced thermal shields and the wall of the reactional vessel in accordance with operating conditions, but also counteracts the normally reduced peripheral flow of the main coolant system. Accordingly, the flow passages between the thermal shields and the vessel wall can be reduced with a concomitant conservation of space within the vessel.

The aforedescribed auxiliary coolant system, as disclosed herein and employed for cooling the thermal shields of the reactional vessel, is arranged such that only a comparatively small pressure differential can be attained at any given time between the main vessel coolant flowing interiorly of all the thermal shields and the coolant flowing between the thermal shields and the walls of the reactional vessel. Therefore, the thermal shields can each be made from comparatively thin structural material in order to limit the thermal stresses developed therein and to facilitate fabrication and installation thereof, inasmuch as little pressure stress is applied thereto.

Referring now more particularly to the drawings, the illustrative form of the invention shown therein comprises a reactional vessel 10 having a generally spheroidal configuration and provided with opposed intake and outlet manifolds 12 and 14, respectively. It should be pointed out, however, that the invention can be adapted with equal facility to a vessel having cylindrical or other configuration. The reactional vessel 10 is arranged, in this application of the invention, for containing a sufficient quantity of fissile material maintained within the reactional vessel 10 for sustaining a chain reaction therewithin. The fissile material is supported in the interior 16 of the vessel by suitable means (not shown) or alternatively is mixed in a pulverulent form thereof with a coolant-moderator fluid to form a slurry. In the latter case, a flow of the slurry is maintained through the vessel 10, which slurry fills substantially the entire interior volume 16 of the vessel. Hence, the aforesaid volume, when the reactional vessel is associated with a nuclear reactor, is selected such that the desired state of criticality is attained by the fissile material contained in the slurry, in order to sustain the chain reaction. For convenience in manufacturing, the vessel 10 is fabricated from a number of sections 18 which are joined by annular sealing welds 20, respectively. The aforesaid manifolds 12 and 14 are then secured to the vessel 10 by additional sealing welds 22. The reactional vessel 10 in this example, is mounted upon a suitable concrete base, indicated generally by the reference character 24, through the employment of appropriate supporting and stabilizing structure 26.

In order to withdraw heat from the chain reaction, or other process evolving heat and contained within the vessel 10, from the coolant including the aforementioned slurry when employed, the manifolds 12 and 14 are provided with inlets 28 and outlets 30, respectively. In addition, the intake manifold 12, which is disposed at the bottom of the vessel 10, is furnished with a drain outlet 32. Communicating with the manifolds 12 and 14, by way of the associated inlets or outlets, are a plurality of primary coolant loops, with four being utilized in this example of the invention, for maintaining a coolant flow through the reactional vessel 10 and for extracting power therefrom in the form of heat. Each of the coolant loops comprises a heat exchanger 34, pumping means 36, and associated auxiliary equipment (not shown), all of which are coupled by conduits 38 and 40 to an inlet 28 and an outlet 30, respectively, of the aforesaid manifolds. The conduit 40 and the heat exchanger 34 are coupled by a conduit 42 to the suction side 44 of the pumping means. The pumping means 36 is operated to maintain a flow of the aforesaid coolant through the reactional vessel 10, as indicated by arrows 46.

Adjacent the interior wall surfaces 48 of the reactional vessel 10, are disposed one or more thermal shields, with three, 50, 52 and 54, being utilized in this example of the invention. The aforesaid thermal shields are each formed with substantially the same configuration as that of the interior surfaces 48 of the vessel, but are spaced therefrom and from one another in order to provide coolant flow passages 56 between the thermal shields and the vessel wall 48. Each of the thermal shields 50, 52 and 54 is provided with a lower inlet opening 58, whereby the flow passages 56 and the interior of the innermost thermal shield communicate with the lower or intake manifold 12 and with the interior 16 of the reactional vessel. Thus, a peripheral portion of the incoming reactional vessel coolant is diverted into the flow passages 56, as indicated by arrows 60. In furtherance of this purpose, a number of generally tubular, belled baffles are supported, by suitable means (not shown), in the lower portion of the vessel 10 and adjacent the intake manifold 12. In this example of the invention, two such baffles 62 and 64 are utilized and serve not only to deflect a peripheral portion of the incoming coolant into the flow passages 56, but additionally to distribute the vessel coolant evenly throughout the interior 16 thereof.

Each of the thermal shields is further provided with an upper outlet opening 66 or 68, respectively, which is opposed to or spaced from the inlet opening 58. Adjacent the upper opening 68 of the innermost thermal shield 54, this shield is sealed to the inner wall surface 48 of the reactional vessel 10 desirably at a position adjacent the lower end of the upper or outlet manifold 14 of the reactional vessel. In one example of the invention, the innermost thermal shield 54 is secured to the reactional vessel 10, as aforesaid, by an annular sealing weld 70 and is tapered upwardly into alignment with the interior surface of the outlet manifold 14, as indicated by the reference character 72, in order to minimize turbulence in the coolant stream flowing through the interior 16 of the vessel. The outlet openings 66 of the outer thermal shields 50 and 52 afford communication between a manifold or header tube 74 described below and those passages 56 enclosed between adjacent thermal shields, while the outlet opening 68 of the innermost shield 54 supplies the main coolant stream 46 to the vessel outlet manifold 14.

As stated heretofore, in order to maintain an adequate coolant flow through the passages 56 for removing heat absorbed by the thermal shields 50, 52 and 54, means are provided associated with at least one of the aforesaid coolant loops for developing a slightly higher pressure differential across the flow passages 56 adjacent the aforesaid thermal shields than that maintained across the interior portion of the reactional vessel 10, or between the manifolds 12 and 14. Such means additionally are adapted for ready adjustability in order to control the rate of flow of coolant through the passages 56 in accordance with operating conditions as determined by the progress of the chain reaction or other process being sustained within the vessel 10.

Figure 2:
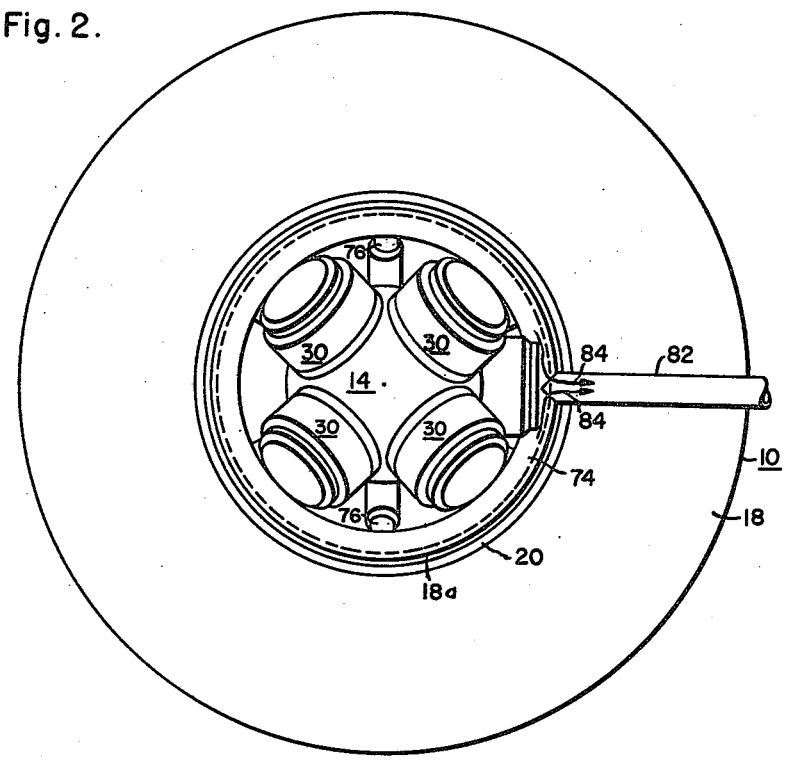
FIG. 2 is a top plan view of the reactional vessel illustrated in FIG. 1.
Figure 3:
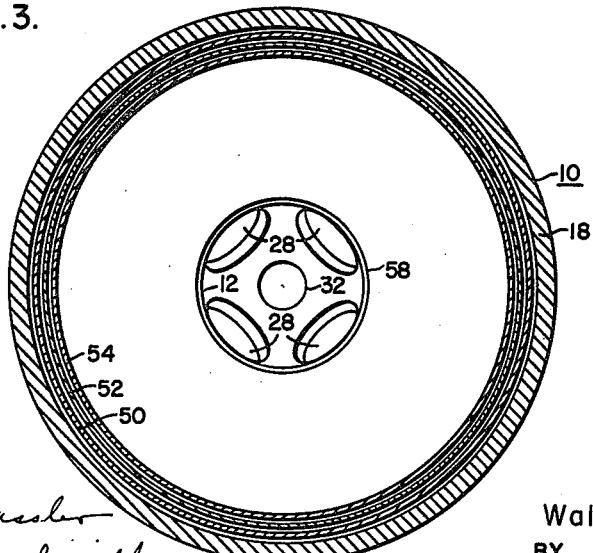
FIG. 3 is a cross-sectional view on a reduced scale of the reactional vessel of FIG. 1 taken along lines III—III thereof, with parts being removed for clarity.

One arrangement of the aforesaid flow maintaining and adjusting means, according to the invention, comprises the circular header tube 74 disposed, in this example, adjacent the base of the outlet manifold 14 of the reactional vessel 10. The header tube 74 is supported relative to the exterior wall of the vessel section 18a by a series of short connecting tubes 76, with six being utilized in this example, as better shown in FIG. 2 of the drawings. Each of the connecting tubes 76 communicates with the header tube 74, to which it is secured, and in addition communicates with its associated aperture 78 provided in the wall of the vessel section 18a whereat each connecting tube 76 is hermetically sealed to the wall of the reactional vessel 10, as by an individual sealing weld 80. Each of the apertures 78 is disposed adjacent the upper opening 68 of the innermost thermal shield 54 but downwardly of the welded junction 70 between the innermost shield and the interior vessel wall surface 48. Accordingly, each of the connecting tubes 76 and the associated tube 74 communicate with all of the thermal shield flow passages 56. For this purpose the openings 66 of the thermal shields 50 and 52 are left relatively free.

In order to increase the pressure drop across the flow passages 56, relative to the pressure drop existing between the intake and outlet manifolds 12 and 14, respectively, of the reactional vessel 10, the header tube 74 is coupled directly to the suctional side 44 of the pumping means 36 through a conduit 82. As a result, the pumping means maintains a coolant flow through the thermal shield passages 56, as indicated by the arrows 60 and arrows 84. Inasmuch as the header tube 74 is thus coupled directly to the intake side of the pumping means, the pressure differential maintained between the intake manifold 12 and the header tube 74, that is to say, across the thermal shield flow passages 56, is substantially equal to the pressure drop maintained through the entire coolant loop with which the thermal shield coolant system is associated. On the other hand, the pressure drop existing between the intake and outlet manifolds 12 and 14 or across the interior 16 of the reactional vessel is less than the pressure differential maintained by the pumping means 36, by the amount of the pressure drop created by the heat exchanger 34 and other auxiliary equipment (not shown) coupled into the main coolant loop. The pressure differentials developed by the pumping means, associated with the other coolant loops (not shown) respectively coupled to the intake and outlet manifolds, obviously are substantially equal to that delivered by the pumping means 36 and, therefore, will not materially effect the pressure differential maintained across the thermal shield flow passages 56 by the pumping means 36. In this arrangement, by coupling the outlets of the thermal shield flow passages 56 directly to the intake side of the pumping means 36 so as to bypass the heat exchanger 34 and the associated auxiliary equipment, the pressure drop existing across the flow passages 56 exceeds only by a relatively small amount that maintained across the interior portions of the reactional vessel 10, which amount is equal to the pressure drop created by the heat exchanger and other auxiliary equipment, as aforesaid. The requirement of a separate pumping means for the thermal shield cooling system is thereby obviated, and, since the pressure differential existing across the thermal shields 50, 52 and 54 can never exceed the comparatively small amount of the aforesaid pressure drop, the thermal shields can be fabricated from relatively thin structural materials. Furthermore, the use of the bypassing conduit 82 permits ready adjustability of coolant flow maintained through the passages 56 as by a valve 86 connected into the conduit 82.

In view of the foregoing, it will be apparent that novel and efficient means for shielding the walls of a reactional vessel from heat or other radiation has been disclosed herein. Although described particularly in connection with a nuclear power plant, obviously the reactional vessel can be adapted with equal facility for use in carrying out other processes. Inasmuch as the foregoing disclosure is therefore exemplary in nature, numerous modifications thereof will occur to those skilled in the art without departing from the spirit and scope of the invention.

I claim as my invention:

1. In a heat transfer system, the combination comprising a reactional vessel, said vessel having inlet and outlet flow openings spaced therein to afford circulation of fluid through a substantial portion of said vessel, heat exchanging means, conduit means coupling said vessel through said openings to said heat exchanging means, pumping means coupled in said conduit means for circulating a heat transfer fluid through said vessel and said heat exchanging means, at least one thermal shield disposed adjacent an inner wall portion of said vessel and intermediate said vessel flow openings, said shield in addition being spaced from said vessel wall portion to form a flow passage between said shield and said wall portion and being joined thereto adjacent an edge portion of the shield at a position upstream of said vessel outlet flow opening, the opposite edge portion of said shield being spaced from said vessel wall portion so that said flow passage can communicate with said vessel inlet opening, said vessel wall having at least one flow aperture extending therethrough and communicating with said flow passage, said aperture being disposed adjacent to but upstream of the junction between said shield and said wall portion, and a conduit coupling said flow aperture to the intake side of said pumping means and in bypassing relation to said heat exchanging means.

2. In a fluid handling system having differing pressure levels therein, the combination comprising a reactional vessel, said vessel having inlet and outlet flow openings spaced therein to afford circulation of fluid through a substantial portion of said vessel, pressure dropping means defining said differing pressure levels, conduit means coupling said vessel through said openings to said pressure dropping means, pumping means coupled in said conduit means for circulating the fluid being handled by said system through said vessel and said pressure dropping means, at least one thermal shield disposed adjacent an inner wall portion of said vessel and intermediate said vessel flow openings, said shield in addition being spaced from said vessel wall portion to form a flow passage between said shield and said wall portion and being joined thereto adjacent an edge portion of the shield at a position upstream of said vessel outlet flow opening, the opposite edge portion of said shield being spaced from said vessel wall portion so that said flow passage can communicate with said vessel inlet opening, said vessel wall having at least one flow aperture extending therethrough and communicating with said flow passage, said aperture being disposed adjacent to but upstream of the junction between said shield and said wall portion, and a conduit coupling said flow aperture to the intake side of said pumping means and in bypassing relation to said pressure dropping means.

3. In a fluid handling system having differing pressure levels therein, the combination comprising a reactional vessel, said vessel having inlet and outlet flow openings spaced therein to afford circulation of fluid through a substantial portion of said vessel, pressure dropping means defining said differing pressure levels in the system, conduit means coupling said vessel through said openings to said pressure dropping means, pumping means coupled in said conduit means for circulating the fluid being handled by said system through said vessel and said pressure dropping means, at least one thermal shield disposed adjacent an inner wall portion of said vessel and intermediate said vessel flow openings, said shield in addition being spaced from said vessel wall portion to form a flow passage between said shield and said wall portion and being joined thereto adjacent an edge portion of the shield at a position upstream of said vessel outlet flow opening, the opposite edge portion of said shield being spaced from said vessel wall portion so that said flow passage can communicate with said vessel inlet opening, said vessel wall having a plurality of flow apertures extending therethrough and communicating with said flow passage, said apertures being disposed adjacent to but upstream of the junction between said shield and said wall portion, a header disposed exteriorly of said vessel and adjacent said apertures, additional conduit means coupling said flow apertures to said header, and a conduit coupling said header to the intake side of said pumping means and in bypassing relation to said pressure dropping means.

4. In a fluid handling system having differing pressure levels therein, the combination comprising a reactional vessel, said vessel having inlet and outlet flow openings spaced therein to afford circulation of fluid through a substantial portion of said vessel, pressure dropping means defining said differing pressure levels, conduit means coupling said vessel through said openings to said pressure dropping means, pumping means coupled in said conduit means for circulating the fluid being handled by said system through said vessel and said pressure dropping means, at least one thermal shield disposed adjacent an inner wall portion of said vessel and intermediate said vessel flow openings, said shield in addition being spaced from said vessel wall portion to form a flow passage between said shield and said wall portion and being joined thereto adjacent an edge portion of the shield at a position upstream of said vessel outlet flow opening, the opposite edge portion of said shield being spaced from said vessel wall portion so that said flow passage can communicate with said vessel inlet opening, said vessel wall having at least one flow aperture extending therethrough and communicating with said flow passage, said aperture being disposed adjacent to but upstream of the junction between said shield and said wall portion, a conduit coupling said flow aperture to the intake side of said pumping means and in bypassing relation to said pressure dropping means, and valve means coupled in said conduit for determining the rate of flow therethrough and through said flow passage.

5. In a fluid handling system having differing pressure levels therein, the combination comprising a reactional vessel, said vessel having inlet and outlet flow openings spaced therein to afford circulation of fluid through a substantial portion of said vessel, pressure dropping means defining said differing pressure levels, conduit means coupling said vessel through said openings to said pressure dropping means, pumping means coupled in said conduit means for circulating the fluid being handled by said system through said vessel and said pressure dropping means, at least one thermal shield disposed adjacent the inner wall portions of said vessel which are intermediate said vessel flow openings, said shield being generally tubular in form to define opposed inlet and outlet flow openings therein which are disposed in communication with said vessel openings respectively, said shield in addition having a configuration corresponding substantially to that of said vessel wall portions and being spaced from said vessel portions to form a flow passage between said shield and said wall portions, said shield being circumferentially joined to said vessel wall portions adjacent its outlet opening at a position upstream of said vessel outlet opening, the inlet opening portion of said shield being spaced from said vessel so that said flow passage can communicate with said vessel inlet opening, said vessel wall having at least one flow aperture extending therethrough and communicating with said flow passage, said aperture being disposed adjacent to but upstream of the junction between said shield and said wall portion, and a conduit coupling said flow aperture to the intake side of said pumping means and in bypassing relation to said pressure dropping means.

6. In a fluid handling system having differing pressure levels therein, the combination comprising a reactional vessel, said vessel having inlet and outlet flow openings spaced therein to afford circulation of fluid through a substantial portion of said vessel, pressure dropping means defining said differing pressure levels, conduit means coupling said vessel through said openings to said pressure dropping means, pumping means coupled in said conduit means for circulating the fluid being handled by said conduit means through said vessel and said pressure dropping means, a plurality of thermal shields disposed adjacent an inner wall portion of said vessel and intermediate said vessel flow openings, said shields being spaced from one another and from said vessel wall portion to form flow passages therebetween and between the outer most one of said shields and said wall portion, the inner most one of said shields being joined to said wall portion adjacent an edge portion of said inner most shield at a position upstream of said vessel outlet flow opening and downstream of the adjacent edges of the remainder of said shields, the opposite edge portion of said inner most shield and the adjacent edge portions of the remainder of said shields being spaced from said vessel wall portion and from one another so that said flow passages can communicate with said vessel inlet opening, said vessel wall having at least one flow aperture extending therethrough and communicating with said flow passages, said aperture being disposed adjacent to but upstream of the junction between said inner most shield and wall portion, and a conduit coupling said flow aperture to the intake side of said pumping means and in bypassing relation to said pressure dropping means.

7. A nuclear reactor system comprising a reactional vessel, said vessel having inlet and outlet flow openings spaced therein to afford circulation of a coolant fluid through a substantial portion of said vessel, a mass of fissile material disposed within said vessel portion, heat exchanging means, conduit means coupling said vessel through said openings to said heat exchanging means, pumping means coupled in said conduit means for circulating said coolant fluid through said vessel and said heat exchanging means, at least one thermal shield disposed adajecent an inner wall portion of said vessel and intermediate said vessel flow openings, said shield in addition being spaced from said vessel wall portion to form a flow passage between said shield and said wall portion and being joined thereto adjacent an edge portion of the shield at a position upstream of said vessel outlet flow opening, the opposite edge portion of said shield being spaced from said vessel wall portion so that said flow passage can communicate with said vessel inlet opening, said vessel wall having at least one flow aperture extending therethrough and communicating with said flow passage, said aperture being disposed adjacent to but upstream of the junction between said shield and said wall portion, and a conduit coupling said flow aperture to the intake side of said pumping means and in bypassing relation to said heat exchanging means.

8. A nuclear reactor system comprising a reactional vessel, said vessel having inlet and outlet flow openings spaced therein to afford circulation of a coolant fluid through a substantial portion of said vessel, a mass of fissile material disposed within said vessel portion, heat exchanging means, conduit means coupling said vessel through said openings to said heat exchanging means, pumping means coupled in said conduit means for circulating said coolant fluid through said vessel and said heat exchanging means, at least one thermal shield disposed adjacent an inner wall portion of said vessel and intermediate said vessel flow openings, said shield in addition being spaced from said vessel wall portion to form a flow passage between said shield and said wall portion and being joined thereto adjacent an edge portion of the shield at a position upstream of said vessel outlet flow opening, the opposite edge portion of said shield being spaced from said vessel wall portion so that said flow passage can communicate with said vessel inlet opening, said vessel wall having a plurality of flow apertures extending therethrough and communicating with said flow passage, said apertures being disposed adjacent to but upstream of the junction between said shield and said wall portion, a header mounted exteriorly of said vessel and disposed adjacent said apertures, conduit means coupling each of said apertures to said header and supporting said header from said vessel, a conduit coupling said header to the intake side of said pumping means and in bypassing relation to said heat exchanging means, and valve means coupled in said conduit for determining the proportion of said collant fluid flowing therethrough and through said flow passage.

References Cited in the file of this patent

Nucleonics, vol. 14 (April 1956), p. 108; vol. 13 (December 1955) p. 45 (article by Macphee).

Proceedings of the International Conference on the Peaceful Uses of Atomic Energy, Aug. 8–20, 1955, United Nations, New York; vol. 3, pages 179, 180, 214, 221,255.

Research Reactors (TID-5275), U.S. Government Printing Office, 1955; page 338.